United States Patent [19]
Yount et al.

[11] Patent Number: 5,466,419
[45] Date of Patent: Nov. 14, 1995

[54] SPLIT FLOW REACTOR TRAYS FOR VERTICAL STAGED POLYCONDENSATION REACTORS

[76] Inventors: Thomas L. Yount, 3208 Nola La.; Larry C. Windes, 1212 Jerry La.; J. Wesley Adams, 4000 Grey Fox Dr., all of Kingsport, Tenn. 37664

[21] Appl. No.: 238,037

[22] Filed: May 2, 1994

[51] Int. Cl.[6] .............................. C08F 2/00; B01D 11/04; F02M 29/04
[52] U.S. Cl. ...................... 422/131; 422/132; 422/134; 422/138; 422/258; 202/158; 261/110; 261/114.5
[58] Field of Search ..................... 422/131, 132, 422/134, 138, 257, 258; 202/158; 203/DIG. 6; 261/110, 114.1, 114.5

[56] References Cited

U.S. PATENT DOCUMENTS

| | | | |
|---|---|---|---|
| 1,084,554 | 5/1931 | Dubbs | 202/158 X |
| 3,017,950 | 1/1962 | Koshoot | 202/158 |
| 3,359,074 | 12/1967 | Dobo | 422/134 |
| 3,509,203 | 4/1970 | Michaelis et al. | |
| 3,658,484 | 4/1972 | Bright | 202/158 X |
| 3,787,479 | 1/1974 | Oriehl et al. | |
| 3,841,836 | 10/1974 | Lunsford, Jr. et al. | 422/134 |
| 4,196,168 | 4/1980 | Lewis | 422/134 |
| 4,238,426 | 12/1980 | Slobodyanik | 261/114.1 |
| 4,308,107 | 12/1981 | Markfort | 203/23 |
| 4,615,770 | 10/1986 | Govind | 203/25 |
| 5,013,407 | 5/1991 | Nocca et al. | 202/158 |
| 5,091,060 | 2/1992 | Walker et al. | 203/99 |
| 5,230,839 | 7/1993 | Sampath et al. | 261/110 |

FOREIGN PATENT DOCUMENTS 1320769   6/1973   United Kingdom.

Primary Examiner—Robert J. Warden
Assistant Examiner—Christopher Y. Kim
Attorney, Agent, or Firm—John D. Thallemer; John F. Stevens

[57] ABSTRACT

This invention relates to a vertically disposed polymerization reactor having a series of essentially circular tray assemblies; each tray assembly having a central open vapor chimney and two split-flow paths each split-flow path containing one reverse flow path wherein the liquid polymer flow is reversed by means of a substantially semi-circular turnaround region; each tray having a liquid polymer tray inlet and a liquid polymer tray outlet for conducting a flow of the liquid polymer by means of a hydraulic gradient; each tray assembly being open at the top for escape of vapor from the liquid polymer flow to the central open vapor chimney; and each tray arranged in vertical disposition one above the other.

9 Claims, 3 Drawing Sheets

SPLIT FLOW REACTOR TRAYS FOR VERTICAL STAGED POLYCONDENSATION REACTORS

FIELD OF THE INVENTION

This invention relates to a vertically disposed polymerization reactor having a series of essentially circular tray assemblies; each tray assembly having a central open vapor chimney and two split-flow paths each split-flow path containing one reverse flow path wherein the liquid polymer flow is reversed by means of a substantially semi-circular turnaround region; said trays having a liquid polymer tray inlet and a liquid polymer tray outlet for conducting a flow of the liquid polymer by means of a hydraulic gradient; each tray assembly being open at the top for escape of vapor from the liquid polymer flow to the central open vapor chimney; and said trays arranged in vertical disposition one above the other.

BACKGROUND OF THE INVENTION

Tray designs for vertical oriented polymerization reactors usually employ gravity and vertical drop to achieve the desired degree of polymerization without the complexities of mechanical agitation. In such tray designs, the polymeric melt cascades down the inside of the vertical length of the reaction vessel. Baffles or trays are mounted in the vessel to provide retention of the polymer melts, thereby increasing liquid residence time within the reactor and its exposure to the reaction conditions. The liquid residence time is required to allow sufficient time for the polymerization kinetics to keep up with the enhanced byproduct liberation rates achieved by the increase in the liquid-vapor surface area and the enhancement of its renewal.

U.S. Pat. Nos. 4,196,168, 3,841,836, 3,509,203, 3,359,074 and 3,787,479, and Great Britain Pat. No. 1320769 disclose reactors wherein the reacting media flows by hydraulic gradient. U.S. Pat. No. 4,196,168 discloses a vertical polymerization reactor having a series of downwardly sloping rectangular trays for conducting a flow of liquid polymer in a descending path. U.S. Pat. No. 3,841,836 discloses a vertical polycondensation reactor having a series of downwardly sloping adjustable rectangular trays and a means for continuously sensing the viscosity of the polymer. Disadvantages associated with the use of rectangular trays are that polymer distribution uniformity across the width of rectangular trays is difficult to achieve with large trays and that 30% of the reactor vessel's cross-sectional area, as compared to a circular tray, is lost. In contrast, simple cross-flow on a circular tray fit into the vessel will result in large stagnant flow regions on the periphery of the tray outside the direct streamlines from the inlet to the outlet. Liquid polymer in stagnant flow regions tends to overcook, obtain a high viscosity, crosslink and/or degrade.

U.S. Pat. No. 3,509,203 discloses a vertical reactor having a series of horizontal structures in cascade arrangement which contain a plurality of annular passages in each tray for horizontal flow of the liquid polymer therethrough and a connecting tube from the center of each horizontal structure for downward travel of the liquid polymer. Disadvantages associated with the reactor disclosed in U.S. Pat. No. 3,509,203 are that the flow path is too long for high viscosity materials, corners in the flow path are sources of stagnant flow regions, the roof inhibits vapor transmission and adds unnecessarily to the complexity of construction, and the tubes for flow between the trays prevent the free flow of a film which would enhance the liberation of vapor.

U.S. Pat. No. 3,359,074 discloses a vertical polycondensation reactor having a series of circular trays containing substantially equally spaced, chordwise extending slots. The slots are operative to generate the necessary surface renewal within the relatively more viscous fluid medium passing therethrough. Disadvantages associated with the reactor disclosed in U.S. Pat. No. 3,359,074 are that there is no positive hold-up volume on the trays, the residence time is controlled by fluid viscosity and flow rate, and the slots must be sized accurately for a particular liquid rate and liquid physical properties or the tray could flood or completely drain out. In addition, the vapor flow control mechanism is subject to plugging.

U.S. Pat. No. 3,787,479 discloses a vertical reactor having a series of circular trays with transverse baffles creating several approximately rectangular segments. Thus, the trays contain an elongated side-to-side flow path for plug-like flow of the reaction medium from one side of the tray to the other. Disadvantages associated with the reactor disclosed in U.S. Pat. No. 3,787,479 are that corners in the flow path are sources of stagnant flow regions, and the tubes for flow between the trays prevent the formation of a free-flowing film to enhance the liberation of vapor.

Great Britain Pat. No. 1320769 discloses a reactor having substantially horizontal spiral flow channels, open along the top wherein the side walls of the spiral flow channel are constructed as closed flow ducts. Disadvantages associated with the reactor disclosed in Great Britain Pat. No. 1320769 are that the use of horizontal spiral flow channels without reverse turnarounds prevents the equalizing of flow paths and the "inside" track is shorter than the "outside" track. In addition, the use of only one tray greatly limits the available free surface area, and prevents the formation of a free-falling film between trays which enhances the liberation of vapor.

Thus, the above-mentioned references are deficient in that they include either (a) stagnant flow regions caused by material being bypassed by material flowing within a shorter-path streamline, or (b) poor utilization of the circular space within horizontal cross-section of a vertically oriented cylindrical vessel.

In contrast, the reactor of the present invention utilizes a circular tray having two split-flow paths which efficiently utilize the cross-sectional area of a cylindrical reactor while providing uniform liquid polymer melt flow path lengths which minimize stagnant flow or dead zone regions. In addition, the reactor of the present invention is able to process high viscosity liquids and provide controlled residence time (liquid volumetric holdup) for the occurrence of chemical reactions. Moreover, the reactor of the present invention is designed to allow vapor traffic to escape each tray and travel to the reactor's vapor outlet along a path external to the path of the polymer flow.

SUMMARY OF THE INVENTION

Accordingly, it is one object of the present invention to provide an apparatus for the production of condensation polymers.

Accordingly, it is another object of the invention to provide a split-flow tray design for a vertical, gravity flow-driven polymerization reactor which increases utilization for liquid retention of the space contained within a substantially cylindrical pressure vessel.

Accordingly, it is a further object of the invention to provide a split-flow tray design that minimizes stagnant flow regions and increases liquid velocities.

Accordingly, it is also an object of the invention to provide a split-flow tray design that uniformly distributes the flow on each tray.

Accordingly, it is also a further object of the invention to provide a split-flow tray design which contains channels that reverse the flow of a liquid by approximately 180° in order to obtain similar flow path lengths along the flow streamlines without the presence of stagnant flow regions or eddies.

Accordingly, it is an additional object of the invention to provide a split-flow tray design which provides large amounts of vapor-liquid surface area and creates thin liquid films for bubble devolatilization.

These and other objects are accomplished herein by a polymerization reactor having a vertically disposed outer shell, a liquid polymer reactor inlet near the top of the reactor, a liquid polymer reactor outlet at the bottom of the reactor, and a vapor outlet, comprising a series of essentially circular split-flow tray assemblies which are fully enclosed within said reactor vessel;

each split-flow tray assembly having a central open vapor chimney and two liquid polymer flow paths each flow path containing one reverse flow path wherein the liquid polymer flow is reversed by means of a substantially semi-circular turnaround region;

said trays having a liquid polymer tray inlet and a liquid polymer tray outlet for conducting a flow of the liquid polymer; flow of the liquid polymer is accomplished by means of a hydraulic gradient wherein the height of fluid surface at the liquid polymer tray inlet is greater than the height of fluid surface at the liquid polymer tray outlet; and said tray assemblies extending to said outer shell in vertical disposition one above the other.

BRIEF DESCRIPTION OF THE DRAWINGS

The invention will be more fully understood and further advantages will become apparent when reference is made to the following detailed description of the invention and the accompanying drawings in which.

DESCRIPTION OF THE INVENTION

Figure 1:
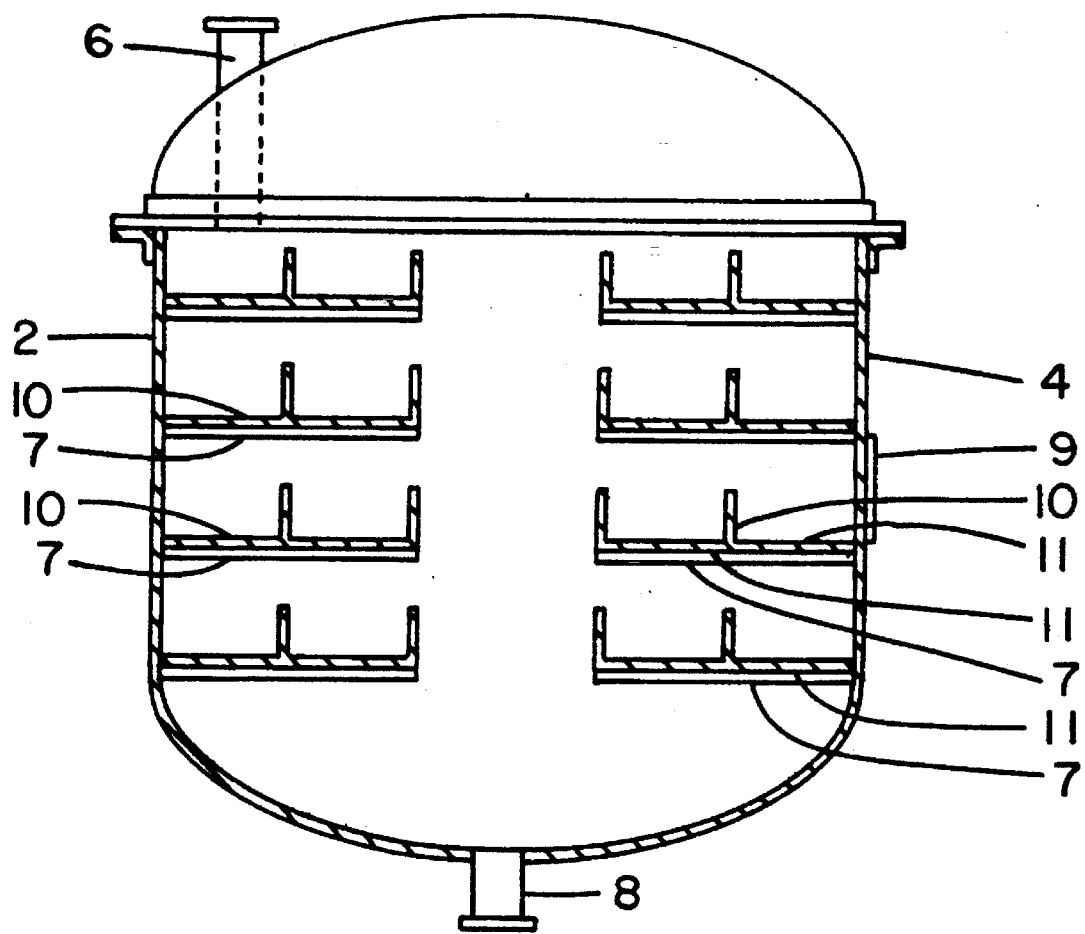
FIG. 1 is a schematic representation of a vertical section of the polymerization reactor.

The present invention relates to a vertically disposed polymerization reactor having a series of essentially circular split-flow tray assemblies. In reference to FIG. 1, the polymerization reactor 2 has a vertically disposed shell 4, a liquid polymer reactor inlet 6 near the top of the shell 4 for entrance of a liquid polymer into the reactor 2, a vapor outlet 9, and a liquid polymer reactor outlet 8 at the bottom of the shell 4 for exit of the liquid polymer from the reactor 2.

The improvement in the polymerization reactor 2 is in the series of essentially circular split-flow tray assemblies 10 which are fully enclosed within said reactor 2. Enclosure of the outer perimeter of the tray assemblies 10 may be either the shell 4 of the reaction vessel 2 or a separate enclosure wall 12 which prevents liquid polymer from splattering out and over the perimeter of the tray assemblies 10. As set forth in FIG. 2, the tray assemblies 10 have a liquid polymer tray inlet 14 and a liquid polymer tray outlet 16. Each tray assembly 10 has a central open vapor chimney 18 bounded by an inner wall 20.

The tray assemblies 10 may contain a means for heating liquid monomer or polymer. Suitable heating means 7 include electric resistance, steam, and heat transfer medium chemicals. Preferably, the heating means is uniform and is located on the bottom side of the tray assemblies 10. A preferred heating means is the use of a heat transfer liquid in half pipe jackets which are secured to the bottom side of the tray assemblies 10.

Figure 4:
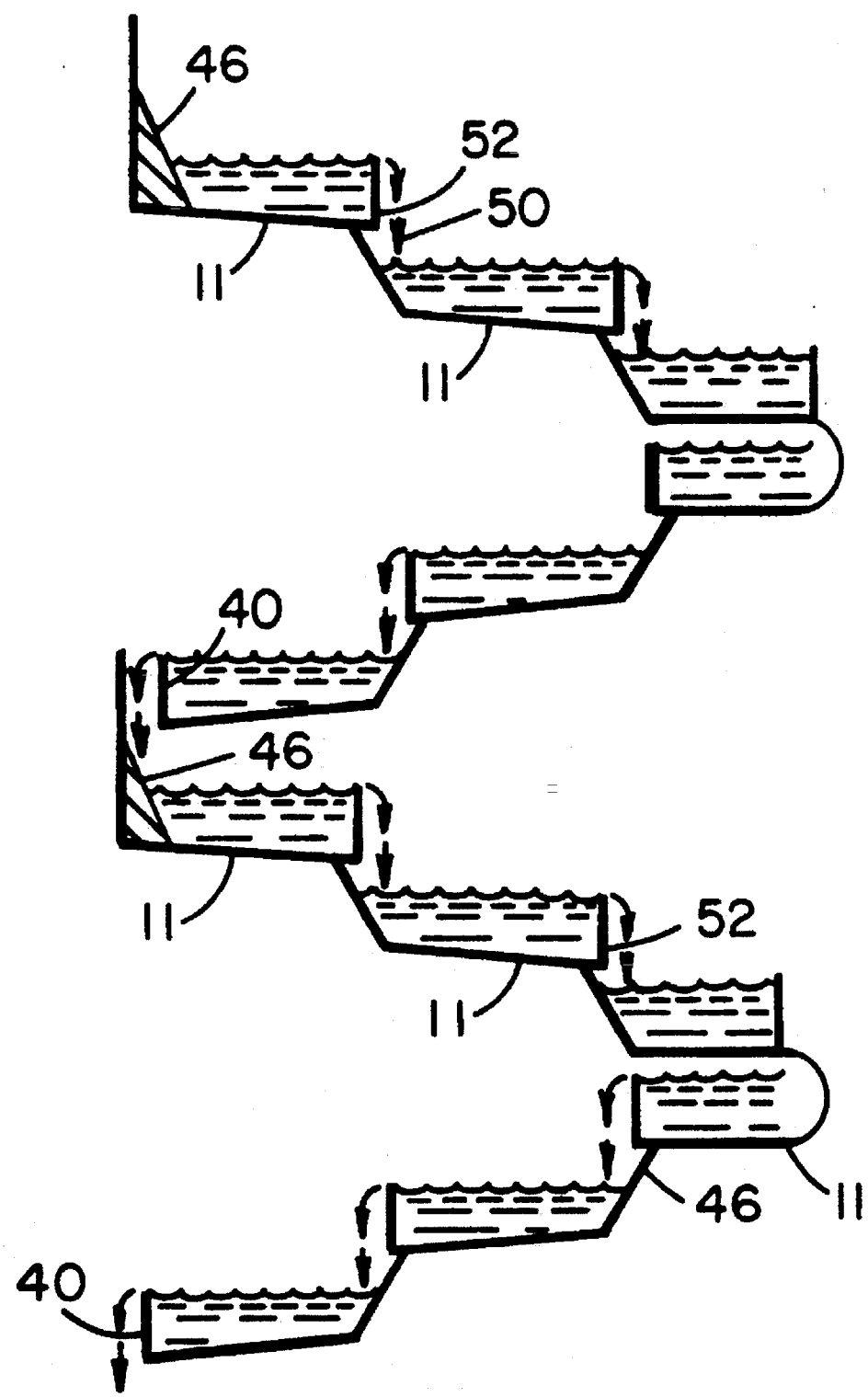
FIG. 4 is a schematic representation of a vertical section of a split-flow tray with sloping floors and vertical falls.

Liquid polymer flows along two paths which are enclosed by means of an outer wall 12, an inner wall 20, a middle wall 22 between the outer wall 12 and the inner wall 20, and a semi-circular turnaround region 24. The walls have sufficient height to prevent spillage of the liquid polymer. The tray floor 11 of the tray assemblies 10 may be flat or downward sloping and may contain vertical falls 50. The downward slopes and vertical falls 50 on the tray floor 11 may be adjustable to provide control of the depth of liquid polymer in the paths. For example, FIG. 4 illustrates a vertical section of a split-flow tray having a sloping floor and vertical falls 50. Increasing the slope and/or increasing the frequency of vertical falls 50 results in shallow polymer depths which rapidly liberate byproducts. In addition, weirs 52 may be positioned at intermediate points on the flow path or at the vertical falls.

Each split-flow path has a reverse flow path wherein the liquid polymer flow is reversed by means of a substantially semi-circular turnaround region 24. Without the flow path turnarounds, polymer streamlines which start on the outermost wall of the tray would have a considerably longer path to traverse than polymer streamlines which start near the inside wall of the flow path. With the flow path turnarounds, the streamline paths of the liquid polymer across the entire flow path can be averaged. The semi-circular turnaround region 24 may have either a complete semi-circular turnaround wall 25 or the semi-circular turnaround wall 25 may be partially eliminated whereby metal surfaces are eliminated and polymer drag which may occur along the metal surface is reduced.

In addition, a partially eliminated semi-circular turnaround wall 25 allows liquid polymer to redistribute in the two flow paths in order to correct for any potential maldistribution of the polymer resulting from warping of the tray floor or an obstruction. In the case of a semi-circular turnaround wall 25 which is partially eliminated, two baffles, an outer baffle 28 and an inner baffle 30, are used to direct the flow of liquid polymer in the respective flow paths. A preferred split-flow tray design overlaps the two semi-circular turnaround regions in order to improve the flow distribution of liquid polymer and eliminate zones of slow flow.

Preferably, the width of the flow path 26 is decreased by up to 40% by means of a flow restrictor element 36 at the midpoint of the semi-circular turnaround region 24. The flow restrictor element 36 pinches the polymer flow in the semi-circular turnaround region which forces a good sweep of the liquid polymer along the semi-circular turnaround wall 25, thereby minimizing stagnant flow zones in the semi-circular turnaround region 24. The flow restrictor element 36 can be an extension of the middle wall 22, a vertical cylinder, such as a circular cylinder, attached to the end of the middle wall 22, or other bluff body having a vertical axis.

Optionally, the middle wall 22 in each path can be tapered into the flow restrictor element 36. The flow restrictor element 36 and the use of overlapping semicircular turnaround regions 24 where the semi-circular turnaround wall 25 is partially eliminated, cause a gradual temporary contraction in the width of the cross-sectional flow path 26 and subsequent gradual expansion to the original width of the cross-sectional flow path 26. Preferably, the width of the flow path 26 is reduced 15% to 50%, more preferably 20% to 30%, in the semi-circular turnaround region 24.

The flow direction of the liquid polymer is reversed in the semi-circular turnaround region 24 before the liquid polymer flows to the tray outlet 16. Prior to the tray outlet 16, preferably, is an outlet weir 40. The polymer flows over and/or through the outlet weir 40 which controls the depth of liquid polymer in the flow path 26. The outlet weir 40 is of such length that as the liquid polymer flows over or through the outlet weir 40, the liquid polymer is sheared into a thin film. The liquid polymer flows from upper tray assemblies 10 to lower tray assemblies 10 by means of gravity. Preferably, the liquid polymer flows from one tray assembly 10 to a lower tray assembly 10 as a free falling film.

The horizontal length of the outlet weir 40 is preferably longer than the width of the flow path 26. The elongated outlet weir 40 may be straight or curved. Such elongated outlet weir 40 provides averaging of the flow path length of the liquid polymer streamlines by correcting differences in the lengths of streamline flow paths. In addition, an elongated outlet weir 40 reduces the thickness of the film created by the liquid polymer melt as it flows over the outlet weir 40 and, thus, affords better shear thinning of the liquid polymer. The thinning process shears small bubbles of vaporized byproducts and releases that portion of the byproducts trapped in bubbles which would otherwise be too small to break free of the viscous liquid polymer. The liberation of byproducts which are removed as vapor is necessary in the polycondensation process in order to build up the molecular weight of the polymer.

Flow of the liquid polymer is accomplished by means of a hydraulic gradient wherein the height of fluid surface at the liquid polymer tray inlet 14 is greater than the height of fluid surface at the outlet weir 40. The higher velocity of the liquid polymer, compared with rectangular single-pass trays, washes the flow channel which minimizes buildup of polymer on the channel walls and reduces the potential for stagnant flow regions. In addition, the higher velocity improves heat transfer effectiveness which decreases resistance to the transfer of thermal energy and eliminates overcooking of the polymer in localized hot-spots.

Figure 2:
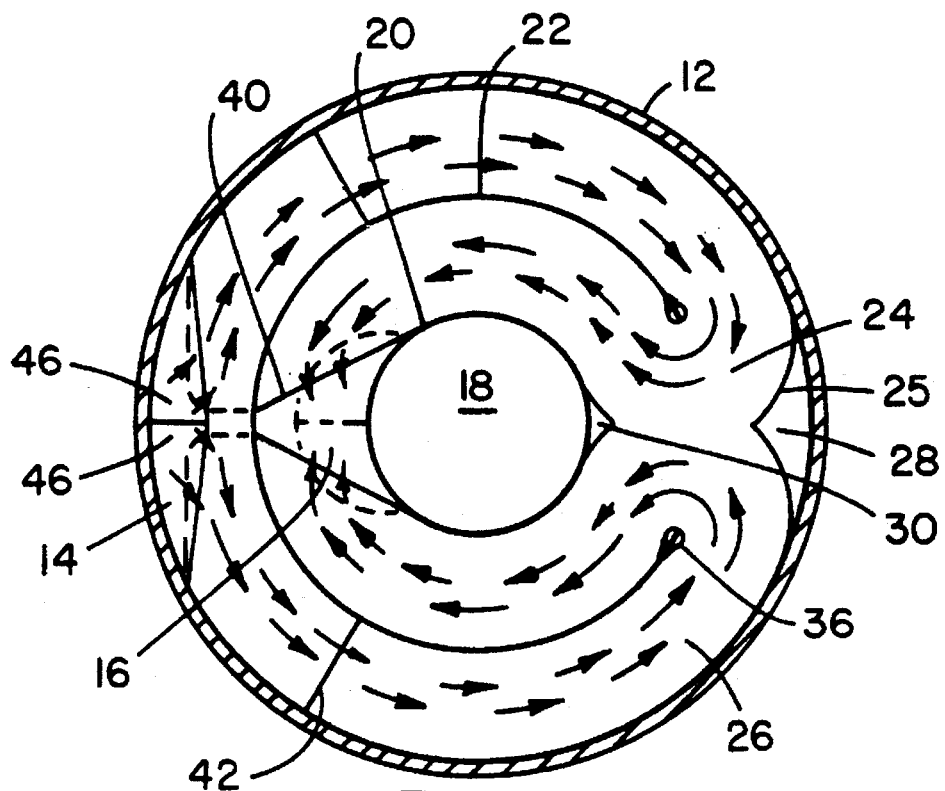
FIG. 2 is a schematic representation of a split-flow tray. Polymer flow begins on the outside and is indicated by arrows.
Figure 3:
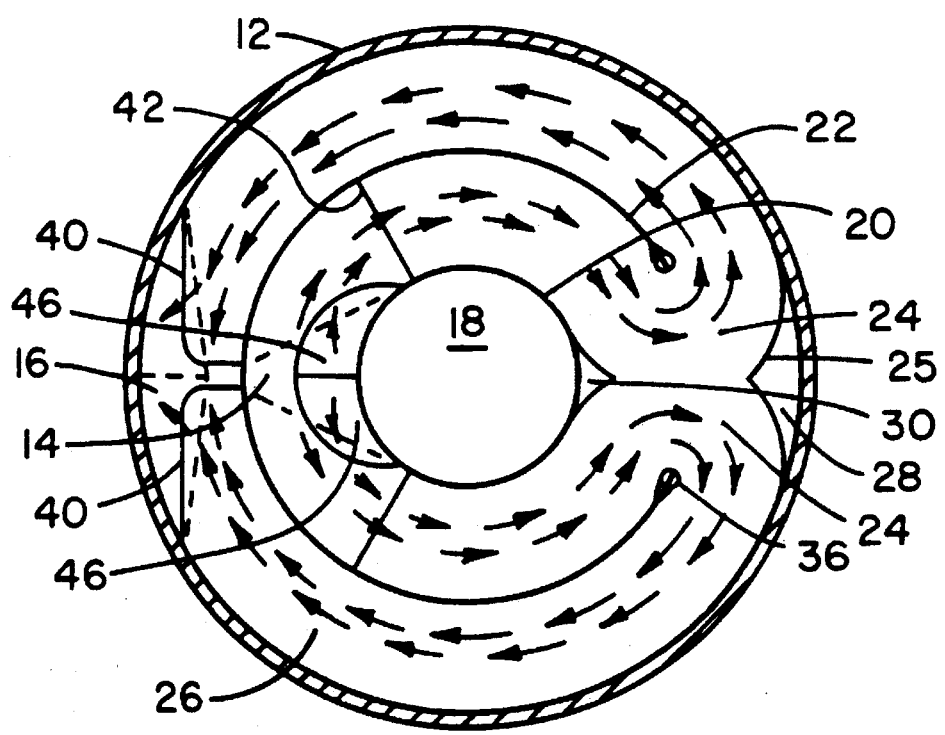
FIG. 3 is a schematic representation of a split-flow tray. Polymer flow begins on the inside and is indicated by arrows. It is paired with the tray of FIG. 2.

The liquid polymer from an upper tray assembly outlet flows into an inlet region 14 of a lower tray assembly. The inlet region 14 is located either at the outside of the trays, as shown in FIG. 2, wherein the liquid polymer flows inward toward the center of the tray, or the inlet region 14 is located at the inside of the trays, as shown in FIG. 3, wherein the liquid polymer flows outward from the center of the tray. A sloped entry 46 is recommended at the tray inlet region 14 to prevent stagnant flow regions in the flow paths 26. The liquid polymer flows in the flow paths 26 through redistribution weirs 42. The redistribution weir 42 prevents channeling of the polymer melt by distributing the polymer across the width and depth of the channel. The liquid polymer flows in the flow paths until the liquid polymer flow is reversed by means of a substantially semi-circular turnaround regions 24. The flow of the liquid polymer is continued until the liquid polymer passes over and/or through outlet weirs 40 into the tray outlet 16 for flow by gravity to the inlet region 14 of a lower tray assembly 10.

Each tray assembly 10 may be open at the top for escape of vapor from the liquid polymer over the middle wall 22 and/or inner wall 20 and then radially to the central vapor chimney 18. In contrast, each tray assembly 10 may be closed at the top to force the vapor to move cocurrently to the flow of liquid polymer through the tray outlet 16. The tray assemblies 10 extend to said outer shell 4 in vertical disposition one above the other. In the case where the trays are open at the top, the tray assemblies 10 are far enough apart to allow for vapor to escape and the walls are shallow enough to allow for vapor to escape. The vapor thus escapes along paths that do not interfere with the liquid polymer flow paths. Vapor from the tray assemblies 10 collects in the central open vapor chimney 18 and is channeled along the central open vapor chimney 18 to the vapor outlet 9 of the reactor vessel 2. The central open vapor chimney 18 encompasses 1 to 25 percent, preferably 6 to 12 percent, of the total cross-sectional area of each tray. The exact size of the central open vapor chimney 18 for a specific reactor vessel 2 is dependant on the size of the reactor vessel 2 and the vapor volumetric flow rate. On large reactor columns, the central open vapor chimney 18 can be used to provide access for inspection, cleaning, and modifications.

Variations of the disclosed reactor will suggest themselves to those skilled in this art in light of the above detailed description. All such obvious modifications are within the full intended scope of the appended claims.

What is claimed is:

1. A polymerization reactor having a vertically disposed outer shell, a liquid polymer reactor inlet near the top of the reactor, a liquid polymer reactor outlet near the bottom of the reactor, and a vapor outlet, comprising a plurality of vertically spaced, horizontally disposed, essentially circular split-flow tray assemblies which are fully enclosed within said reactor, and which extend to and are circumferentially attached to the outer shell;

each tray assembly having a central open section forming a portion of a common vapor chimney connected to the vapor outlet, with open access to the liquid polymer surface on each tray afforded by vertical spacing between successive tray assemblies;

each tray assembly having at least one aperture providing a free passageway to permit the discharge of a downwardly flowing liquid to the tray immediately below;

each tray assembly constructed to facilitate traversal of at least two streams of liquid polymer over the floor of the tray in a plurality of flow channels from at least one tray inlet to at least one tray outlet;

wherein flow of the liquid polymer is accomplished by means of a hydraulic gradient wherein the height of the fluid surface at the tray inlet is greater that the height of the fluid surface at the tray outlet, and the flow channels are defined by baffle walls having sufficient height to prevent spillage of liquid polymer, said baffle walls forming at least two flow channels each having at least two curved subsections, wherein each stream of the liquid polymer flows between subsections through a channel section defined by a substantially semi-circular turnaround region wherein the angular direction of the flow of liquid polymer within the channel is reversed.

2. The reactor of claim 1 wherein the tray assemblies include a heating means.

3. The reactor of claim 2 wherein the heating means is selected from the group consisting of electric resistance, steam, and heat transfer medium chemicals.

4. The reactor of claim 1 wherein the flow path width is gradually decreased in the semi-circular turnaround region by use of a flow restrictor element and at least one baffle, and the flow path width is subsequently increased to its original value.

5. The reactor of claim 4 wherein the flow path width is reduced up to 50% by means of a bluff body flow restrictor near the midpoint of the semi-circular turnaround region.

6. The reactor of claim 5 wherein the flow path width is reduced 15 to 40 percent in the semi-circular turnaround region.

7. The reactor of claim 1 wherein the central open vapor chimney comprises 1 to 25 percent of the total cross-sectional area of each tray.

8. The reactor of claim 7 wherein the central open vapor chimney comprises 6 to 12 percent of the total cross-sectional area of each tray.

9. The reactor of claim 1 wherein the liquid polymer free falls vertically from a tray outlet to a tray inlet of a lower tray.

* * * * *